US012602763B2

(12) United States Patent　　(10) Patent No.:　US 12,602,763 B2
Otaki et al.　　　　　　　　　　　　(45) Date of Patent:　　Apr. 14, 2026

(54) RADIOGRAPHIC IMAGING APPARATUS AND MAINTENANCE MANAGEMENT SYSTEM

(71) Applicant: KONICA MINOLTA, INC., Tokyo (JP)

(72) Inventors: Junichiro Otaki, Hachioji (JP); Tomonori Komasaka, Hino (JP); Kiichi Takamiya, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 209 days.

(21) Appl. No.: 18/457,611

(22) Filed: Aug. 29, 2023

(65) Prior Publication Data

US 2024/0078655 A1　　Mar. 7, 2024

(30) Foreign Application Priority Data

Sep. 2, 2022　　(JP) ................................. 2022-139695

(51) Int. Cl.
*A61B 6/42*　　　　(2024.01)
*G01N 23/04*　　　(2018.01)
*G06T 7/00*　　　　(2017.01)

(52) U.S. Cl.
CPC ........... *G06T 7/0004* (2013.01); *G01N 23/04* (2013.01); *G06T 2207/10128* (2013.01); *G06T 2207/30148* (2013.01)

(58) Field of Classification Search
CPC ......... G06T 7/0004; G06T 2207/10128; G06T 2207/30148; G01N 23/04; A61B 6/4208; A61B 6/54
See application file for complete search history.

(56) References Cited

U.S. PATENT DOCUMENTS

| | | | | |
|---|---|---|---|---|
| 2012/0022830 A1* | 1/2012 | Prajescu | ................. | D06F 58/48 |
| | | | | 702/176 |
| 2018/0132805 A1* | 5/2018 | Jacob | .................. | H10F 39/1898 |
| 2018/0156680 A1 | 6/2018 | Kikuchi | | |
| 2019/0029611 A1* | 1/2019 | Travish | ................ | A61B 6/4007 |

FOREIGN PATENT DOCUMENTS

JP　　　　2018091723 A　　6/2018

OTHER PUBLICATIONS

Japanese Office Action dated Oct. 7, 2025, issued in Japanese Patent Application No. 2022-139695 with English Translation (11 pages).

* cited by examiner

*Primary Examiner* — David J Makiya
*Assistant Examiner* — Mamadou Faye
(74) *Attorney, Agent, or Firm* — Buchanan Ingersoll & Rooney PC

(57)　　　　　　ABSTRACT

A radiographic imaging apparatus includes: a sensor panel that includes a scintillator that emits light by receiving radiation, and a plurality of radiation detection elements that detect the emitted light;
　a housing that stores the sensor panel; and
　a first detector that detects infiltration of a liquid into the housing.

16 Claims, 7 Drawing Sheets

RADIOGRAPHIC IMAGING APPARATUS AND MAINTENANCE MANAGEMENT SYSTEM

CROSS-REFERENCE TO RELATED APPLICATIONS

The entire disclosure of Japanese Patent Application No. 2022-139695 filed on Sep. 2, 2022 is incorporated herein by reference in its entirety.

TECHNICAL FIELD

The present invention relates to a radiographic imaging apparatus, and a maintenance management system.

DESCRIPTION OF THE RELATED ART

An attempt to provide a radiographic imaging apparatus (radiation detector) with an acceleration sensor, and measure and collect an impact acceleration due to falling or collision has conventionally been made.

For example, JP2018-91723A describes that a radiographic imaging apparatus is provided with an acceleration sensor, an impact determination value is calculated based on detection of an acceleration by the acceleration sensor, the impact determination value is cumulatively added and compared with a predetermined threshold, and if the accumulated value exceeds the predetermined value, a notification is issued.

Unfortunately, according to the conventional radiographic imaging apparatus includes a TFT (Thin Film Transistor) substrate made of glass, the glass is broken and the apparatus becomes unusable more often owing to a sudden large impact than to the accumulation of impacts. Even if the impact determination value is collected, it is difficult to use the value to predict breakage.

Unlike this, in recent years, flexible TFTs that include TFT substrates made of flexible materials have been in practical use. Use of them for radiographic imaging apparatuses prevents TFT substrates from being broken and becoming unusable as in conventional cases.

SUMMARY OF THE INVENTION

Unfortunately, even with the radiographic imaging apparatus that includes a flexible TFT, breakage sometimes occurs at an exterior (housing) by an impact, and a liquid, such as a disinfectant or a patients fluid, possibly infiltrates, thus causing a failure in an internal electric system. In such a case, replacement with a new radiographic imaging apparatus is required. Meanwhile, in current view of environment protection, in cases of a flexible TFT and a glass substrate TFT, replacement with recycled one (including reused one) as much as possible is preferable instead of replacement with new one. However, in some liquid infiltration situations, a scintillator that emits light by receiving radiation, and a TFT substrate are sometimes affected, and a sensor panel that includes the affected scintillator and TFT substrate is possibly unable to be reused. For example, CsI (Tl) crystal is used as the material of the scintillator, and a several-year product life is guaranteed. However, soaking with a liquid prevents the product life from being guaranteed, and prevents the product from being recycled.

The present invention has an object to improve the possibility of recycling the radiographic imaging apparatus.

To achieve at least one of the abovementioned objects, according to an aspect of the present invention, a radiographic imaging apparatus reflecting one aspect of the present invention includes:

a sensor panel that includes a scintillator that emits light by receiving radiation, and a plurality of radiation detection elements that detect the emitted light;

a housing that stores the sensor panel; and a first detector that detects infiltration of a liquid into the housing.

To achieve at least one of the abovementioned objects, according to an aspect of the present invention, a radiographic imaging apparatus reflecting one aspect of the present invention includes:

a sensor panel that includes a scintillator that emits light by receiving radiation, and a plurality of radiation detection elements that detect the emitted light;

a housing that stores the sensor panel; and a second detector that detects a breakage of the housing.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments.

[Configuration of Maintenance Management System]

Figure 1:
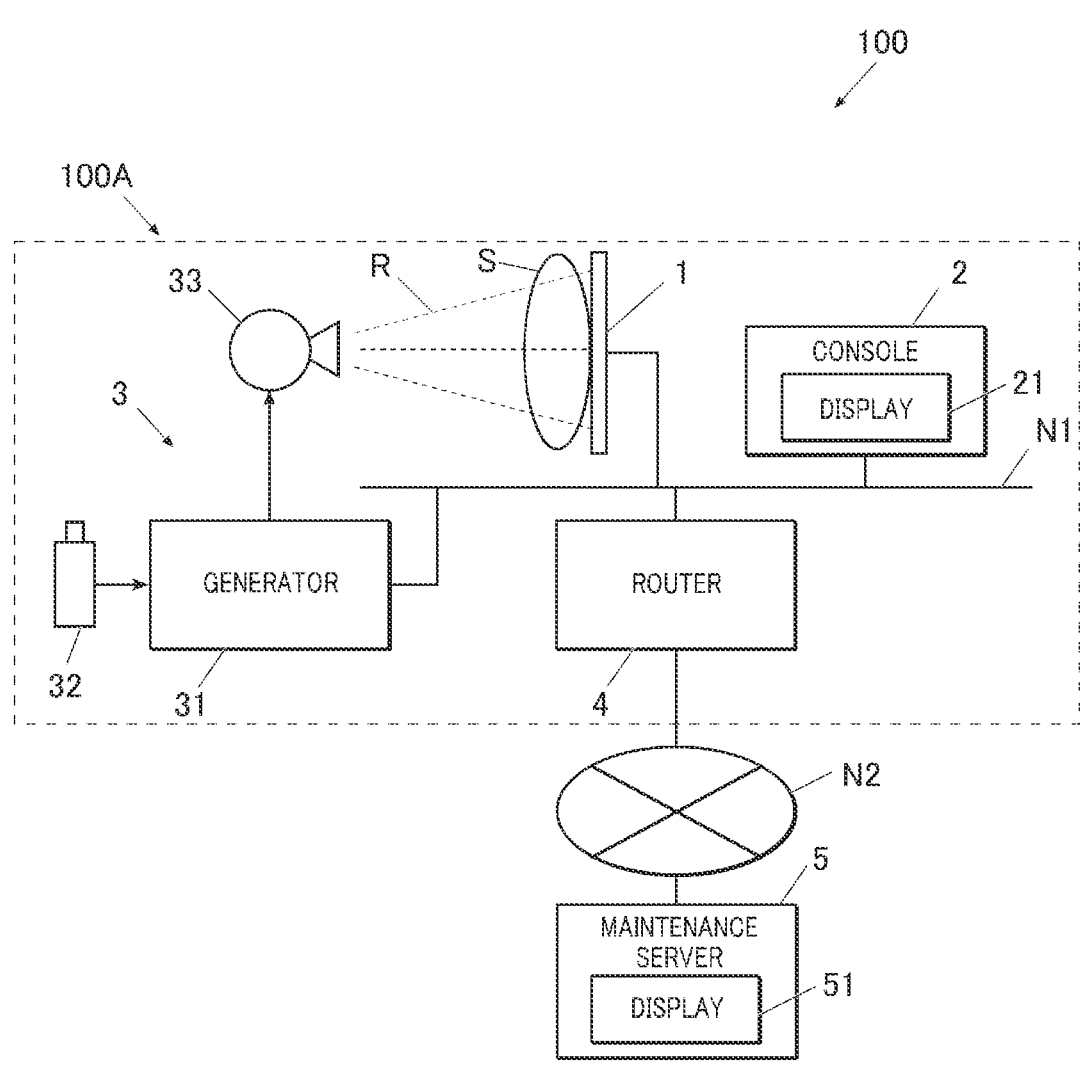
FIG. 1 shows an entire configuration example of a maintenance management system according to this embodiment.

FIG. 1 shows an entire configuration example of a maintenance management system 100.

As shown in FIG. 1, the maintenance management system 100 includes: a hospital system 100A that includes a radiographic imaging apparatus 1, a console 2, a radiation irradiation apparatus 3, and a router 4; and a maintenance server 5 connectable to a hospital system 100A via a router 4 and an external network N2. The apparatuses constituting the hospital system 100A are connected to each other in a manner capable of transmitting and receiving data via a hospital network N1, such as a LAN (Local Area Network). The radiographic imaging apparatus 1 is at least configured to be connected to the maintenance server 5 via the router 4 and the external network N2, such as the Internet, in a manner capable of transmitting and receiving data.

[Configuration of Radiographic Imaging Apparatus]

The radiographic imaging apparatus 1 detects radiation having been emitted from a radiation source 33 of the radiation irradiation apparatus 3 and having transmitted through a subject S, and generates image data on a radiograph where a radiography site of the subject S is radiographed.

Figure 2:
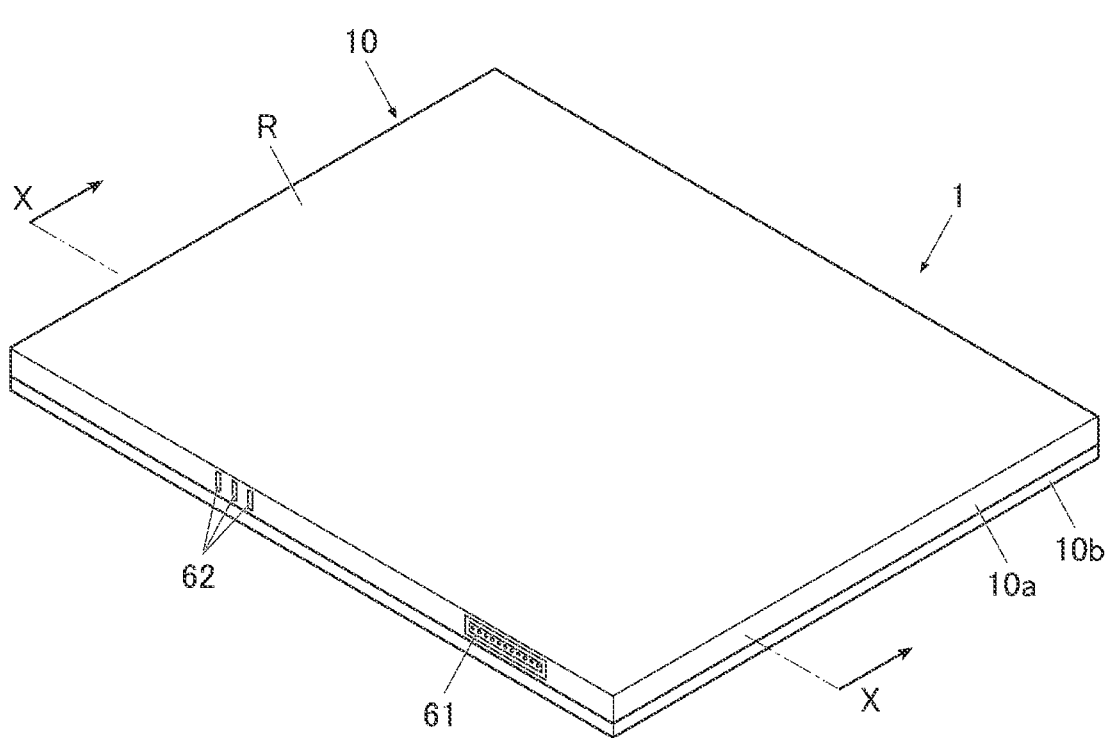
FIG. 2 is a perspective view showing an appearance of a radiographic imaging apparatus in FIG. 1.
Figure 3:
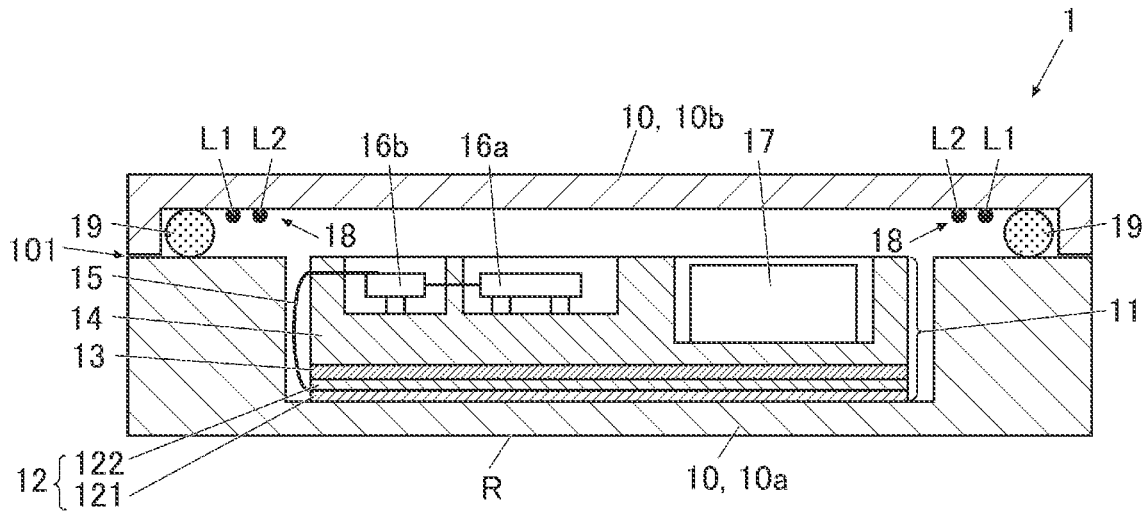
FIG. 3 is a sectional view taken along line X-X of FIG. 2.

FIG. 2 is a perspective view showing an appearance of the radiographic imaging apparatus 1 in this embodiment. FIG. 3 is a sectional view (an upside-down sectional view) taken along line X-X of FIG. 2.

As shown in FIG. 2, a housing 10 of the radiographic imaging apparatus 1 includes a radiation incident surface R that is a plane on a radiation incident side. On a side surface orthogonal to the plane of the housing 10, a connector 61, an indicator 62 and the like are arranged. A cable, a cradle and the like are connectable to the connector 61. The connector 61 supplies power supplied from the connected cable or cradle, to the inside of the radiographic imaging apparatus 1, and performs data communication with an external apparatus via the connected cable or cradle. The indicator 62 includes an LED (Light-Emitting Diode), and emits light or blinks in accordance with the situation of the radiographic imaging apparatus 1.

As shown in FIG. 3, the housing 10 of the radiographic imaging apparatus 1 includes a first housing 10a, and a second housing 10b. The first housing 10a and the second housing 10b are made of a carbon fiber reinforced resin (CFRP), for example. The first housing 10a has a box shape that includes a plane serving as the radiation incident surface R, and side surfaces. The second housing 10b is a lid body that covers a plane opposite to the radiation incident surface R. Similar to the first housing 10a, the second housing 10b may have a box shape (for example, see FIG. 5). The first housing 10a and the second housing 10b are screwed to each other, for example. A junction between the first housing 10a and the second housing 10b is provided with a waterproof member, such as packing 19, thus achieving a configuration resistant to infiltration of a liquid into the inside.

The housing 10 internally stores an internal module 11 that includes a sensor panel 12, a shield layer 13, a spacer 14, a COF 15, a control board 16a, interface board 16b, and a rechargeable battery 17.

The sensor panel 12 is provided in the internal module 11 at a position closer to the radiation incident surface R. The sensor panel 12 is made by, for example, stacking the scintillator 121 and a flexible TFT 122, and encapsulating them. The flexible TFT 122 is formed by arranging radiation detection elements, and TFTs, which are switching elements, in a matrix manner, on a radiographing surface (a surface on a side irradiated with radiation) of a substrate having flexibility. In the sensor panel 12, the scintillator 121 emits light in accordance with the intensity of the radiation when being irradiated with the radiation, radiation detection elements (photodiodes) on the flexible TFT 122 convert the light into charges, and outputs them as a signal to the COF 15.

Figure 5:
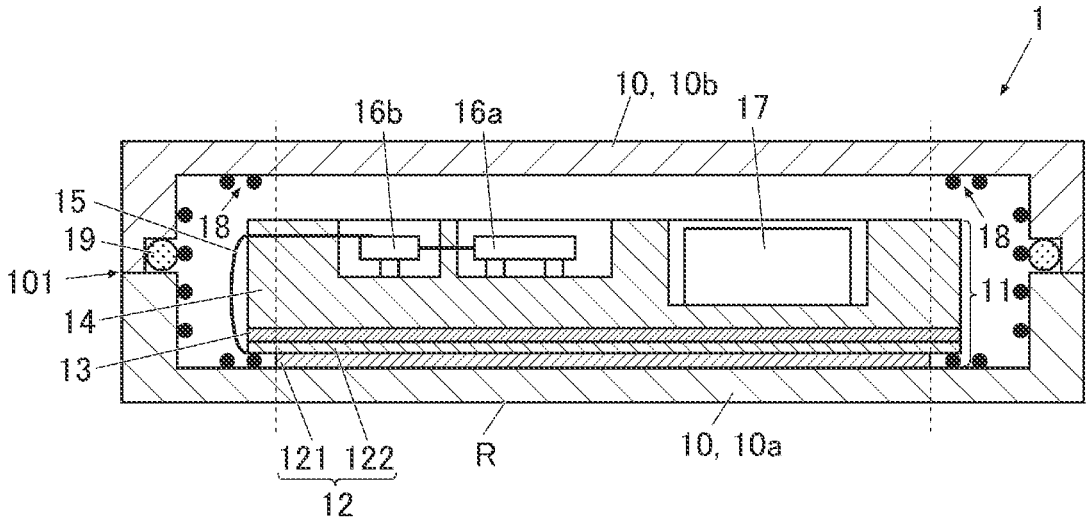
FIG. 5 is a diagram for illustrating an arrangement of the detector.

Note that the ends of the scintillator 121, and the ends of the flexible TFT 122 are not necessarily completely overlaid on each other. For example, as shown in FIG. 5, the ends of the scintillator 121 may positioned inner than the ends of the flexible TFT 122.

The shield layer 13 is made of a metal (e.g., lead) that absorbs the radiation, is provided (caused to adhere) between the sensor panel 12 and the spacer 14, and prevents backscattered radiation from reaching electric circuits, such as the control board 16a and the interface board 16b. Since the shield layer 13 is made of metal and has electrical conductivity, this layer is connected to the ground (GND) and also serves as an electromagnetic field shield layer for the sensor panel 12.

The spacer 14 is a supporter that supports boards, such as the sensor panel 12, the control board 16a, and the interface board 16b. The spacer 14 may be made of a metal or a resin, and is preferably made of foam to reduce the weight.

The COF (Chip On Film) 15 is a flexible board, and connects the flexible TFT 122 of the sensor panel 12, and the interface board 16b to each other. A readout IC (ROIC), not shown, is provided on the COF 15, and AD-converts an analog signal from the sensor panel 12 into a digital signal.

The control board 16a includes a central processing unit (CPU), a read-only memory (ROM), a random access memory (RAM), and a communicator.

The CPU of the control board 16a controls the sensor panel 12, generates image data from the signal obtained by the sensor panel 12, and outputs the data to the console 2 or the like via the communicator. In accordance with a detected signal from a detector 18 (first detector), the CPU of the control board 16a controls the indicator 62 to emit light or blink, and notifies the external apparatus of a detection result of the detector 18 through the communicator.

The communicator of the control board 16a communicates with the external apparatus by wireless communication or via the connector 61.

The interface board 16b performs a process of accumulating the digital signal from the ROIC, and transmitting the signal to the control board 16a.

The rechargeable battery 17 is a secondary battery that supplies power to the boards and the like, and may be a lithium ion capacitor (LiC) or the like.

The internal module 11 can be detached from the housing 10. Accordingly, even in case a liquid infiltrates into the housing 10 or breakage occurs, each component in the internal module 11 can be recycled, with a certain degree of liquid infiltration or breakage. However, in some liquid infiltration situations, recycling is impossible.

For example, it is difficult to recycle the scintillator 121 of the sensor panel 12 in case it gets wet. The flexible TFT 122 has a higher recycling possibility than the scintillator 121 does, and can sometimes be recycled even if it gets wet, but cannot be recycled with a certain degree of liquid infiltration.

Accordingly, the radiographic imaging apparatus 1 in this embodiment includes the detector 18 that detects liquid infiltration into the housing 10, between the housing 10 and the internal module 11. By the detector 18 detecting liquid infiltration before the sensor panel 12 gets wet, the possibility of recycling resources including the sensor panel 12 (the scintillator 121 and the flexible TFT 122) of the radiographic imaging apparatus 1 can be improved.

Figure 4:
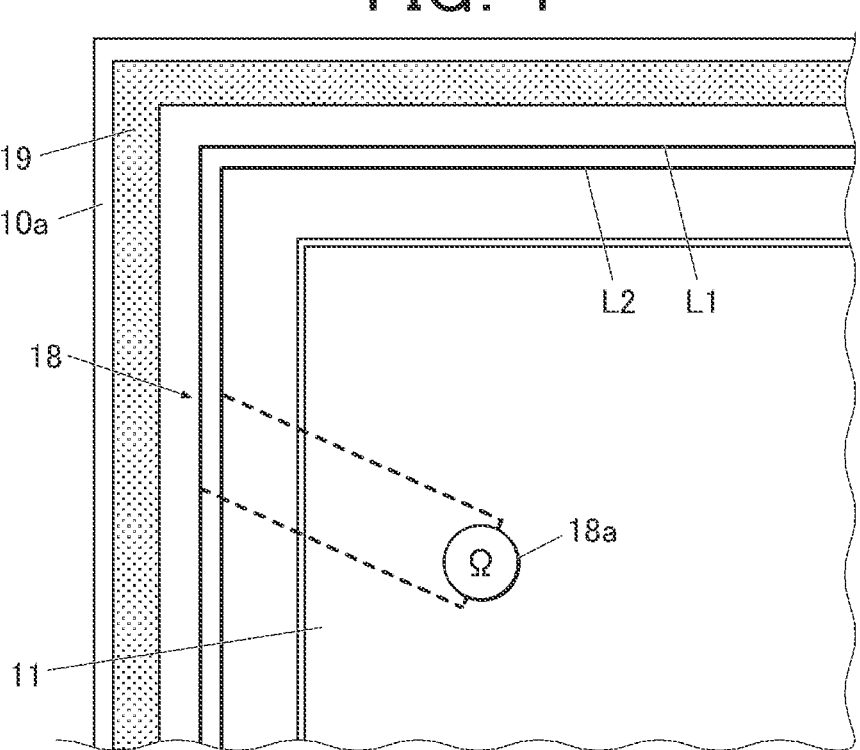
FIG. 4 schematically shows a configuration example of a detector.

FIG. 4 schematically shows a configuration example of the detector 18. FIG. 4 shows internal structure of the housing 10 viewed from the second housing 10b.

As shown in FIG. 4, for example, the detector 18 includes two electrode lines L1 and L2, and a detection circuit 18a, inside of the packing 19 of the housing 10. The electrode lines L1 and L2 are lines made of a metal having a high electroconductivity. The electrode lines L1 and L2 are arranged at a predetermined interval in an insulated state. Typically, the two electrode lines L1 and L2 are not in contact with each other. Accordingly, the resistance (electric resistance) between the electrode line L1 and L2 is infinite. On the other hand, in case infiltration of a liquid brings the liquid into contact with the two electrode lines L1 and L2, and short-circuits the electrode lines L1 and L2, the resistance between the electrode lines L1 and L2 change. The detection circuit 18a detects the liquid infiltration by detecting the change in resistance, and outputs a detected signal to the CPU of the control board 16a.

Note that the electrode lines L1 and L2 may be conductive thin films formed on a substrate made of a resin film or the like by printing, etching, vapor deposition or the like. Preferably, surface treatment, such as gold plating, is applied to the surfaces of the electrode lines L1 and L2 in order to maintain the conductivity.

Preferably, the detector 18 is disposed in at least a position corresponding to a corner of the housing 10 in order to be capable of detecting liquid infiltration at the corner, which is most susceptible in the housing 10. More preferably, the detector 18 is disposed in at least positions corresponding to all the corners of housing 10.

For example, the electrode lines L1 and L2 of the detector 18 may be arranged so as to be drawn in parallel with the plane of the housing 10 along the entire inner periphery of the housing 10.

Alternatively, the detector 18 may be arranged in a divided manner at at least four corners of the housing 10, and liquid infiltration may be detected at each of the four corners. It can thus be identified which corner a liquid infiltrates through.

In consideration of a liquid infiltration path, it is preferable that the detector 18 should be disposed on a near side away from the scintillator 121 and the flexible TFT 122.

In this embodiment, as shown in FIG. 3, the detector 18 is disposed, in the second housing 10b, on a side opposite to a side where the scintillator 121 is disposed in the housing 10.

As described above, the first housing 10a, which covers the scintillator 121 side, has a box shape, and the second housing 10b, which covers the side opposite to the scintillator 121, forms a lid body. That is, a contact area 101 between the first housing 10a and the second housing 10b is positioned on the side opposite to the side where the scintillator 121 is disposed in the housing 10. The contact area 101 is prone to be a liquid infiltration path into the housing 10. As shown in FIG. 3, in the housing 10, the detector 18 is thus disposed on the side opposite to the side where the scintillator 121 is disposed, thereby allowing detection of infiltration of a liquid at a position away from the scintillator 121 immediately after infiltration of the liquid. Accordingly, even in case the liquid infiltrates into the housing 10 of the radiographic imaging apparatus 1, the infiltration of the liquid can be detected before the scintillator 121 or the flexible TFT 122 gets wet. Consequently, the possibility of recycling the sensor panel 12 can be more improved.

In this embodiment, in order to detect the liquid before the scintillator 121 or the flexible TFT 122 gets wet, the detector 18 is disposed in the second housing 10b on the side opposite to the side where the scintillator 121 is disposed in the housing 10. Alternatively, the detector 18 may be disposed in the first housing 10a on the same side where the scintillator 121 is disposed in the housing 10. The arrangement of the detector 18 on the same side where the sensor panel 12 is disposed in the housing 10 facilitates determination of whether or not the sensor panel 12 is wet and breakage occurs.

In a case where the detector 18 is disposed in at least one of the first housing 10a and the second housing 10b, the packing 19 is pressed and crushed by screwing the first housing 10a and the second housing 10b to each other, thus bringing the electrode lines L1 and L2 of the detector 18 into contact also with the other housing. Accordingly, the detector 18 can detect liquid infiltration on both the first housing 10a side and the second housing 10b side.

For example, it is preferable that at least part of the detector 18 (e.g., the electrode lines) should be disposed outside of the scintillator 121 in the housing 10 in a direction parallel with the plane of the housing 10. For example, it is preferable that at least part of the detector 18 should be disposed at positions indicated by solid circles in FIG. 5 (outside of dotted lines in FIG. 5). This arrangement is to allow detection of liquid infiltration before the liquid reaches the scintillator 121, because recycling of the scintillator 121 is difficult in case the scintillator 121 is wet.

In a case where the flexible TFT 122 is wet, the recycling possibility is higher than that in a case where the scintillator 121 is wet. However, at a certain degree of wetting, recycling is sometimes unable. Accordingly, it is more preferable that at least part of the detector 18 (e.g., the electrode lines) should be disposed outside of the sensor panel 12 in the housing 10 in the direction parallel with the plane of the housing 10. More preferably, the entire detector 18 is disposed outside of the sensor panel 12 in the housing 10 in the direction parallel with the plane of the housing 10.

[Configuration of Console]

The console 2 is a control apparatus that includes a controller including a CPU, a storage, an operation receiver, a communicator, and a display 21, and controls radiographing by the radiographic imaging apparatus 1. Upon receipt of a detection result about liquid infiltration from the radiographic imaging apparatus 1, the console 2 issues a notification about the detection result. For example, the console 2 causes the display 21 as a notifier to display the detection result about liquid infiltration by the radiographic imaging apparatus 1. Alternatively, the console 2 may include an audio output device, and issue a notification about the detection result of liquid infiltration through audio.

[Configuration of Radiation Irradiation Apparatus]

The radiation irradiation apparatus 3 includes a generator 31, an irradiation instruction switch 32, and a radiation source 33. Based on operation on the irradiation instruction switch 32, the generator 31 applies power in accordance with a preset radiographing condition to the radiation source 33, and irradiates the subject S and the radiographic imaging apparatus 1 with radiation.

[Configuration of Maintenance Server]

The maintenance server 5 is, for example, a server provided at each site for a maintenance service of the radiographic imaging apparatus 1. The maintenance server 5 includes a controller, a storage, an operation receiver, a communicator, and a display 51. The maintenance server 5 stores and manages information about the radiographic imaging apparatus 1 that is required to be maintained and replaced. The maintenance server 5 receives the detection result of liquid infiltration in the radiographic imaging apparatus 1, and information about the radiographic imaging apparatus 1, and causes the display 51 as a notifier to display the information.

The maintenance service takes out the internal module 11 of the radiographic imaging apparatus 1 collected in replacement, repairs the module 11 if required, recycles usable components, and fabricates a radiographic imaging apparatus 1 that is a recycled product. The radiographic imaging apparatus 1 into which a liquid has infiltrated or in which breakage has occurred is replaced with the refabricated one.

[Operation of Radiographic Imaging Apparatus]

Next, operation of the radiographic imaging apparatus 1 is described.

Upon detection of liquid infiltration, the detector 18 of the radiographic imaging apparatus 1 outputs a detected signal to the CPU of the control board 16*a*.

When the detected signal of liquid infiltration from the detector 18 is input, the CPU of the radiographic imaging apparatus 1 causes the notifier to issue a notification about the detection result by the detector 18. For example, when the detected signal of liquid infiltration is input by the detector 18, the CPU issues the notification about liquid infiltration by causing the indicator 62 to emit light or blink. Alternatively, the CPU of the radiographic imaging apparatus 1 may issue the notification about liquid infiltration by emitting a beeping sound.

Thus, a user can be notified of liquid infiltration into the radiographic imaging apparatus 1, and the user can be prompted to take appropriate measures not to magnify the impact due to liquid infiltration to the sensor panel 12 and the like.

When the detected signal of liquid infiltration is input by the detector 18, the CPU of the radiographic imaging apparatus 1 may serve as an output device, and output the detection result by the detector 18.

For example, the CPU of the radiographic imaging apparatus 1 may output the detection result indicating liquid infiltration to a control program or the like for controlling radiographing operation, and stop the radiographing operation by the control program.

The CPU of the radiographic imaging apparatus 1 may output a detection result indicating detection of liquid infiltration, to the console 2, via a wireless communicator of the control board 16*a*, or the connector 61. Upon receipt of the detection result indicating liquid infiltration from the radiographic imaging apparatus 1, the console 2 causes the display 21 as the notifier to display this result, for example. For example, a message, such as "a liquid has infiltrated into the radiographic imaging apparatus 1" or an icon indicating a warning is displayed. Alternatively, in the case where the console 2 includes an audio output device, a notification may be made by outputting the fact of liquid infiltration into the radiographic imaging apparatus 1, through audio. Thus, the user can be notified of liquid infiltration into the radiographic imaging apparatus 1, and they can be prompted to take appropriate measures not to magnify the impact due to liquid infiltration to the sensor panel 12 and the like.

Upon receipt of the detection result indicating detection of liquid infiltration from the radiographic imaging apparatus 1, the console 2 notifies the radiation irradiation apparatus 3 of termination of irradiation, thus performing control of preventing the radiation source 33 from emitting radiation.

For example, the CPU of the radiographic imaging apparatus 1 may output a detection result indicating detection of liquid infiltration, together with information about the radiographic imaging apparatus 1, to the maintenance server 5, via a wireless communicator of the control board 16*a*, or the connector 61. The information about the radiographic imaging apparatus 1 may include, for example, a serial number, an apparatus type, a manufacturing date, and an installation place. Upon receipt of the detection result indicating liquid infiltration into the radiographic imaging apparatus 1, the maintenance server 5 causes the display 51 as the notifier to display the receipt date and time, the information about the radiographic imaging apparatus 1, the information indicating the fact of liquid infiltration and the like, for example. Alternatively, in a case where the maintenance server 5 includes an audio output device, a notification about such information may be issued through audio. Thus, a service specialist grasps the radiographic imaging apparatus 1 required to be replaced, thus allowing measures for replacement to be quickly taken.

Note that transmission of the detection result indicating detection of liquid infiltration, and the information about the radiographic imaging apparatus 1 to the maintenance server 5 may be performed via the console 2.

Modifications 1

Figure 6A:
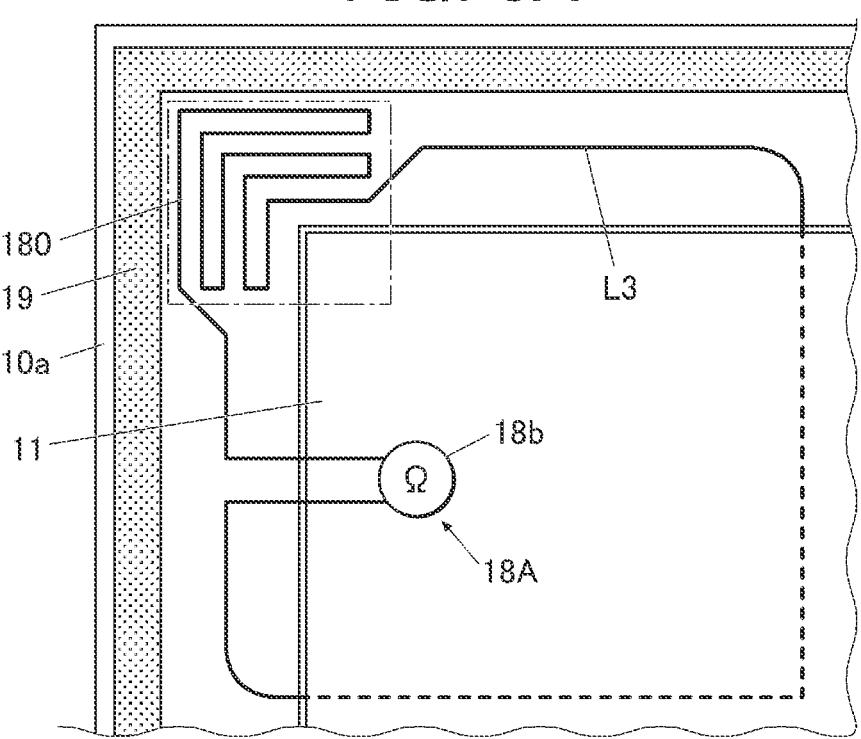
FIG. 6A schematically shows a configuration example of a detector in Modification 1.
Figure 6B:
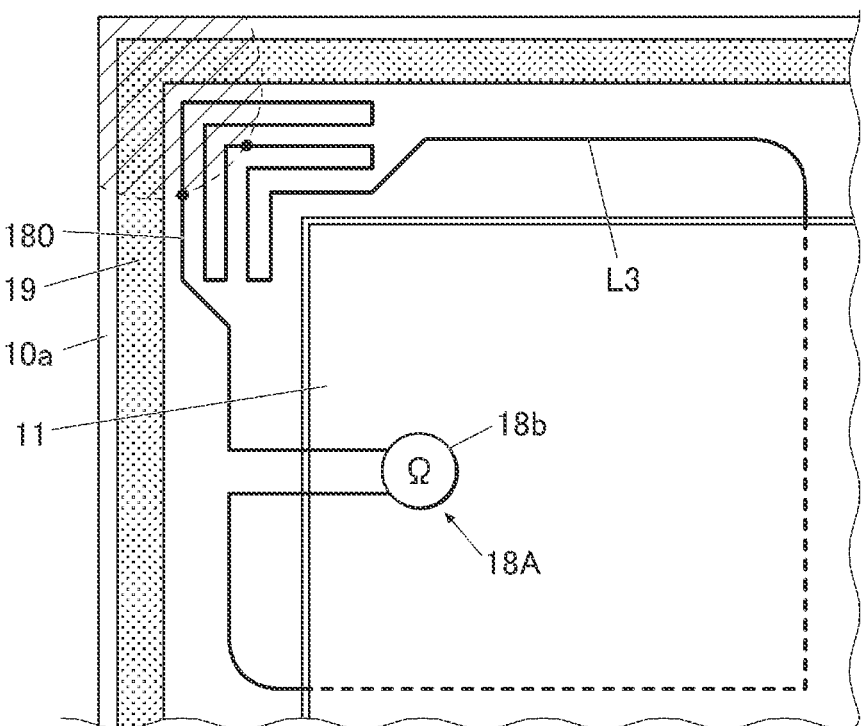
FIG. 6B schematically shows the configuration example of the detector in Modification 1.

In the embodiment described above, liquid infiltration is detected by the detector 18 detecting the change in resistance between the two electrode lines L1 and L2 arranged at an interval. As shown in FIGS. 6A and 6B, a configuration may be adopted in which liquid infiltration is detected by detecting the change in resistance (electric resistance) of one electrode line L3.

For example, as shown in FIG. 6A, a detector 18A as Modification 1 of the detector 18 includes a single electrode line L3, and a detector 18*b*. The electrode line L3 is a line made of a metal having a high electroconductivity, and includes a folded-back segment 180 (indicated by chain line surrounding the segment in FIG. 6A) at a portion (a corner etc.) where a liquid is intended to be detected. As indicated by hatching in FIG. 6B, in case a liquid infiltrates into the housing 10, the folded-back segment 180 of the electrode line L3 is short-circuited. For example, in FIG. 6B, two solid circles of the folded-back segment 180 are short-circuited. Accordingly, the resistance of the electrode line L3 is changed. The detector 18*b* detects the liquid infiltration by detecting the change in the resistance of the electrode line L3, and outputs a detected signal to the CPU of the control board 16*a*.

The detector 18A described above can serve as a second detector, and detect breakage of the housing 10 of the radiographic imaging apparatus 1. For example, in case the corner is broken by an impact or the like when the radiographic imaging apparatus 1 falls, and the folded-back segment 180 at the corner is broken, the resistance of the electrode line L3 becomes infinite. Even if the electrode line L3 is not broken, a possible deformation changes the resistance owing to elongation of the electrode line L3. Consequently, the detector 18*b* can also detect breakage of the housing 10 of the radiographic imaging apparatus 1 by detecting the change in the resistance of the electrode line L3.

A preferable arrangement of the detector 18A is similar to that in the description of the detector 18 in the aforementioned embodiment. Accordingly, the description applies here. The operation of the CPU of the control board 16*a* upon receipt of the detected signal of liquid infiltration from the detector 18A is also similar to that in the description in the aforementioned embodiment. Accordingly, the description applies here.

Modifications 2

In the aforementioned embodiment, the example is described in which at least the electrode lines L1 and L2 of the detector 18 are arranged together along the planes on the inner sides of the housing 10*a* and the second housing 10*b*. However, the arrangement of the electrode lines L1 and L2 is not limited to this.

Figure 7A:
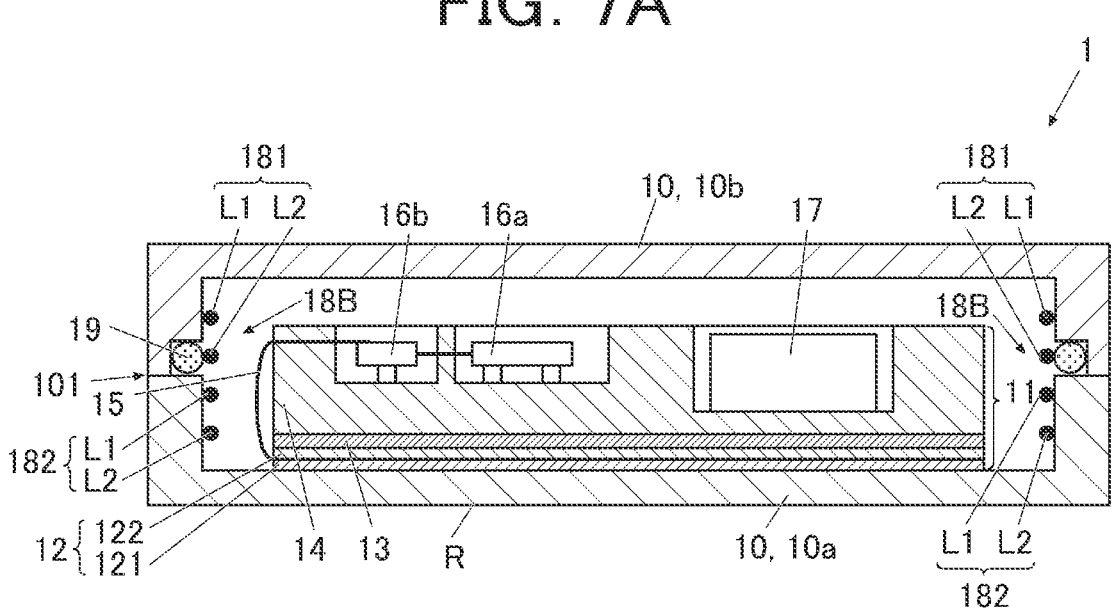
FIG. 7A is a sectional view showing an arrangement of detectors in Modification 2.
Figure 7B:
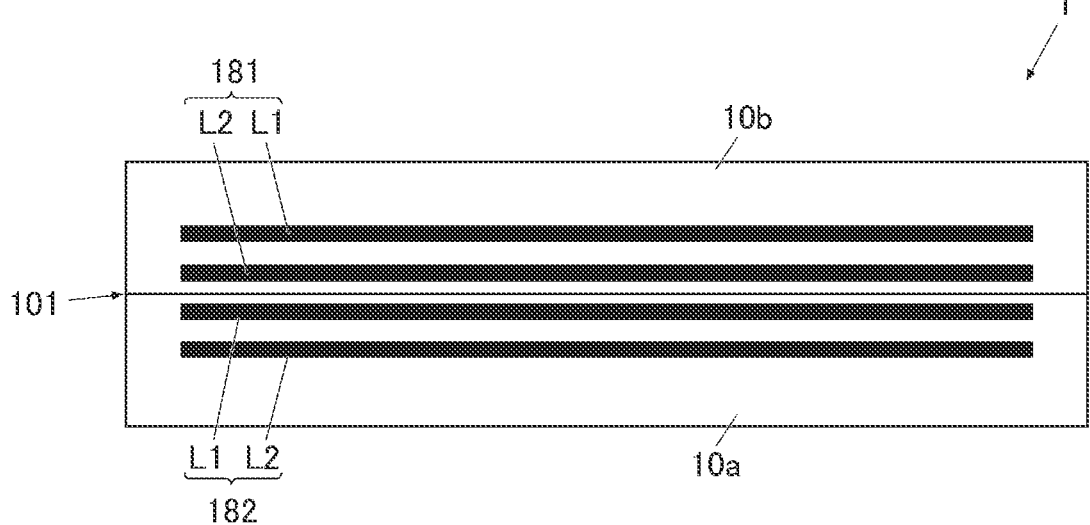
FIG. 7B shows electrode lines of the detectors in Modification 2 viewed from an inner side surface of a housing.

For example, as shown in FIGS. 7A and 7B, a detector 18B as Modification 2 of the detector 18 has a configuration in which electrode lines L1 and L2 of two detectors 181 and 182 are arranged in parallel to the contact area 101 on both sides (first housing 10*a* side, and a second housing 10*b* side) of a contact area 101 between a first housing 10*a* and a second housing 10*b*, where the contact area 101 intervenes. Here, FIG. 7A is a sectional view of a radiographic imaging apparatus 1 according to Modification 2 (a sectional view taken along line X-X of FIG. 2), and FIG. 7B shows a side surface viewed from the inside of the housing 10.

As described above, the configuration is adopted in which the detectors 181 and 182 are arranged on both the sides of the contact area 101 that are prone to serving as a liquid infiltration path, thus allowing effective detection of liquid infiltration. For example, any of a case where a liquid infiltrates on the first housing 10*a* side, a case where a liquid infiltrates on the second housing 10*b* side, and a case of infiltration on both the housing sides can be detected. As a result, the impact on the sensor panel 12 and the like due to liquid infiltration is suppressed, which can improve the recycling possibility.

This configuration, in which the electrode lines L1 and L2 of at least one of the detectors 181 and 182 are arranged on the first housing 10*a* side and the lines L1 and L2 of the other detector are arranged on the second housing 10*b* side, can detect liquid infiltration on both the sides of the contact area 101 with the configuration in which the electrodes do not obstruct possible detachment of the first housing 10*a* and the second housing 10*b*.

Note that a configuration may be adopted in which the electrode line L3 of the detector 18A described in Modification 1 is arranged in parallel with the contact area 101, on both the sides (the first housing 10*a* side and the second housing 10*b* side) of the contact area 101, between which the contact area 101 between the first housing 10*a* and the second housing 10*b* intervenes.

Modifications 3

In the aforementioned embodiment, the example is described in which at least the electrode lines L1 and L2 of the detector 18 are arranged together along the planes on the inner sides of the housing 10*a* and the second housing 10*b*. However, the arrangement of the electrode lines L1 and L2 is not limited to this.

Figure 8A:
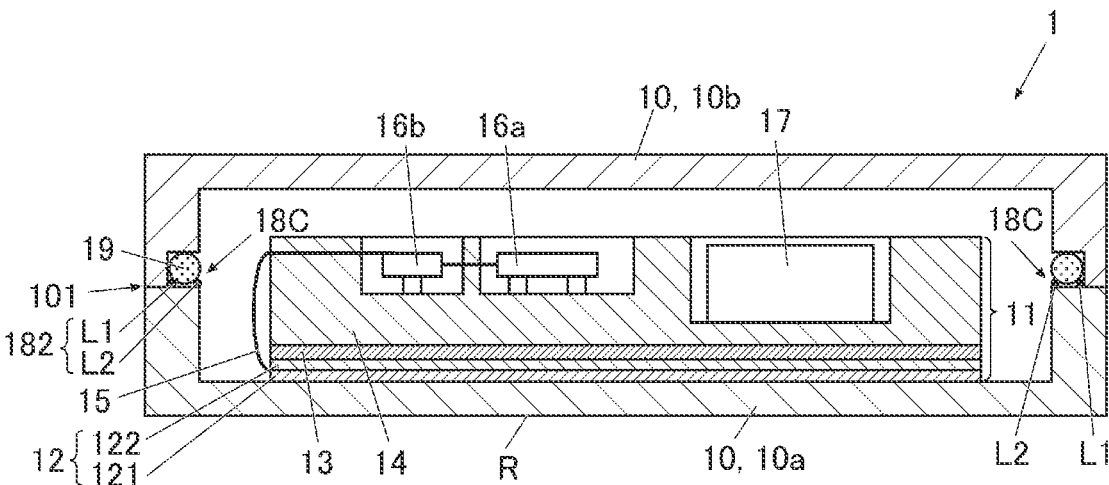
FIG. 8A is a sectional view showing an arrangement of a detector in Modification 3.
Figure 8B:
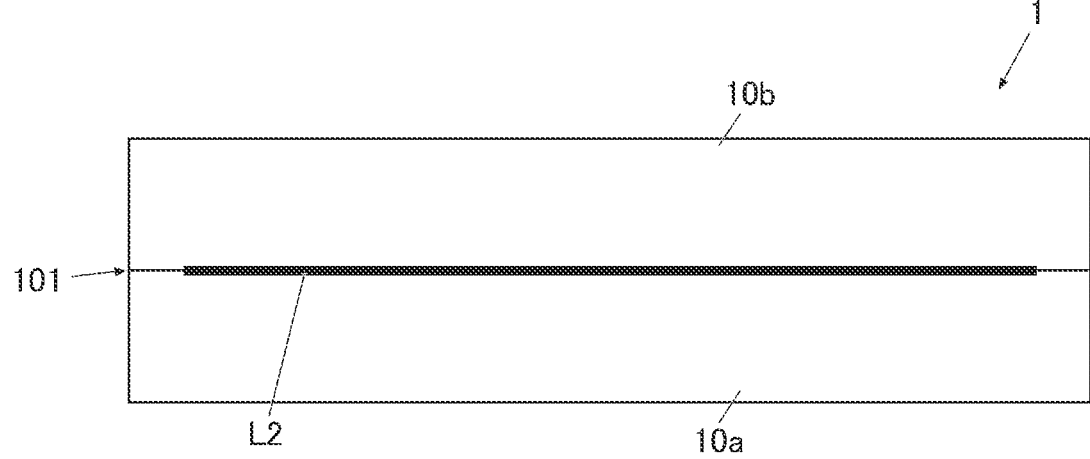
FIG. 8B shows electrode lines of the detector in Modification 3 viewed from an inner side surface of a housing.

For example, as shown in FIGS. 8A and 8B, a detector 18C as Modification 3 of the detector 18 has a configuration in which electrode lines L1 and L2 are arranged so as to cover a contact area 101 between a first housing 10*a* and a second housing 10*b*. Here, FIG. 8A is a sectional view of a radiographic imaging apparatus 1 according to Modification 3 (a sectional view taken along line X-X of FIG. 2), and FIG. 8B shows a side surface viewed from the inside of the housing 10.

Such a configuration is adopted in which the detector 18C is disposed at a position for allowing the electrode lines L1 and L2 cover the contact area 101 prone to serving as a liquid infiltration path, thus allowing immediate detection of liquid infiltration at the start of liquid infiltration. As a result, a possible impact on the sensor panel 12 and the like due to liquid infiltration is suppressed, which can improve the recycling possibility.

Alternatively, a configuration may be adopted in which the electrode line L3 of the detector 18A described in Modification 1 is disposed so as to cover the contact area 101 between the first housing 10*a* and the second housing 10*b*.

Modifications 4

Figure 9:
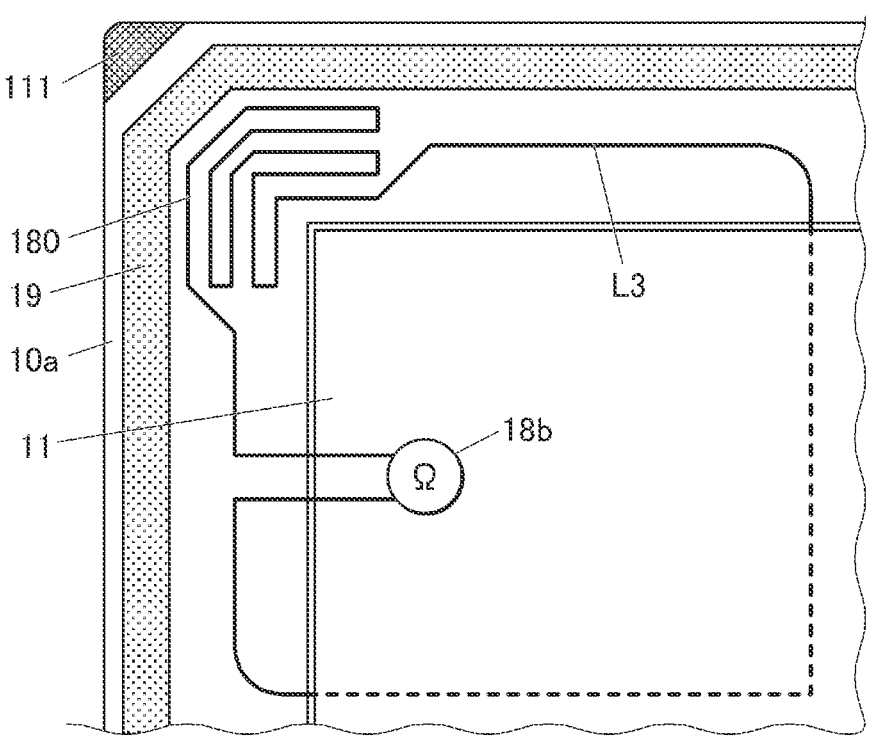
FIG. 9 shows a configuration provided with a protection member at a corner.

As described above a corner of the housing 10 is most prone to being damaged. Accordingly, in the aforementioned embodiments and Modifications 1 to 3, a corner protection member 111 may be provided at each corner of the first housing 10*a* and the second housing 10*b*, as shown in FIG. 9. The corner protection member 111 can be made of a metal, rubber, elastomer or the like. Accordingly, an advantageous effect can be expected that alleviates an impact of falling or the like, prevents the exterior from being broken, and prevents a liquid from infiltrating through a broken site.

Note that the corner protection member 111 itself possibly falls owing to an excessive impact, accumulation of impacts or the like, and it is difficult to completely prevent breakage of the housing 10 only by the corner protection member 111. Accordingly, it is desirable to provide the detector 18 (18A to 18C) in the housing 10, and detect liquid infiltration.

Modifications 5

The detector that detects liquid infiltration into the housing 10 may have a configuration in which a member that changes in color or shape owing to moisture is provided in the housing 10, and the liquid is chemically detected. For example, a configuration may be adopted in which the housing 10 is provided with a transparent window through which the member changing in color or shape owing to moisture is visible, and the user can verify whether the member is change in color or shape.

Modifications 6

In recent years, the radiographic imaging apparatus 1 is sometimes excessively sterilized in view of preventing infection. In a case of a large quantity of disinfectant is used, the liquid possibly infiltrates not only into the radiographic imaging apparatus 1 but also into the cable. Accordingly, it is desirable to adopt, as the cable, a waterproof cable having a waterproof structure.

For example, a head of the cable connects a terminal for engagement with the connector 61 to cable element, which are covered with a housing. Preferably, a seam between the terminal and the housing, or a seam between housings is provided with a waterproof member, or a gap is filled with a waterproof adhesive.

In some cradles and visiting cars, a storing recess that stores the radiographic imaging apparatus 1 is provided with a connector in conformity with an external connection terminal (connector 61) of the radiographic imaging apparatus 1, thus allowing communication and charging while the apparatus is stored. In such cradles and visiting cars, if the radiographic imaging apparatus 1 wet with disinfectant or the like is connected to the connector, and the liquid infiltrates through the connector, the cradle and the visiting cars are broken. Accordingly, the connector may have a waterproof structure, or the waterproof cable described above is used also as the connector. Thus, in the cradles and visiting cars, liquid infiltration through the connector or the cable can be prevented.

Furthermore, at the connector to the radiographic imaging apparatus 1 or in the housing of the cable in the cradle or the visiting car, a detector equivalent to the detector 18 (may be the detectors 18A to 18C) may be provided. In case a liquid is detected by the detector in the cradle or the visiting car, a notification about liquid infiltration may be issued through a display or an audio output device of the cradle or the visiting car. Accordingly, even in case the waterproof structure fails by a load or an impact during usage and a liquid infiltrates, the liquid can be detected before reaching the components in the connector or the cable, which can prevent a failure.

As described above, the radiographic imaging apparatus 1 includes: the sensor panel 12 that includes the scintillator 121, and the flexible TFT 122; the housing 10 that stores the sensor panel 12; and the detector 18 that detects liquid infiltration into the housing 10.

Thus, the user can take measures for preventing the impact of liquid infiltration from being magnified. Accordingly, the possibility of recycling the radiographic imaging apparatus 1 can be improved.

The radiographic imaging apparatus 1 includes: the sensor panel 12 that includes the scintillator 121, and the flexible TFT 122; the housing 10 that stores the sensor panel 12; and the detector 18A as the second detector that detects breakage of the housing 10.

Thus, the user can take measures for preventing the impact of breakage of the housing 10 from being magnified. Accordingly, the possibility of recycling the radiographic imaging apparatus 1 can be improved.

The maintenance management system 100 outputs the detection result of liquid infiltration into the radiographic imaging apparatus 1, to the console 2 as the external apparatus, and the console 2 displays the detection result on the display 21, thus issuing a notification.

Consequently, a radiographer and the like operating the console 2 can be notified of liquid infiltration into the radiographic imaging apparatus 1. Accordingly, measures can be quickly taken, and the possibility of recycling the sensor panel 12 in the radiographic imaging apparatus 1 can be improved.

The maintenance management system 100 notifies the maintenance server 5 as the external apparatus of the detection result of liquid infiltration into the radiographic imaging apparatus 1, and the maintenance server 5 displays the detection result on the display 51, thus issuing a notification.

Consequently, an operator at a maintenance service site provided with the maintenance server 5 can be notified of liquid infiltration into the radiographic imaging apparatus 1. Accordingly, measures can be quickly taken, and the possibility of recycling the sensor panel 12 in the radiographic imaging apparatus 1 can be improved.

Note that the description details in the aforementioned embodiments are only examples of the radiographic imaging apparatus and the maintenance management system according to the present invention. There is no limitation to the examples.

For example, in the embodiments and their modifications, the description is made assuming that the TFT substrate of the sensor panel 12 is the flexible TFT substrate. However, the TFT substrate may be a glass substrate.

Detailed configurations and detailed operation of the radiographic imaging apparatus, and apparatuses included in the maintenance management system can be changed as appropriate within a range not deviating from the gist of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A radiographic imaging apparatus, comprising:
a sensor panel that includes a scintillator that emits light by receiving radiation, and a plurality of radiation detection elements that detect the emitted light;
a housing that stores the sensor panel, wherein the housing includes a first housing that covers at least part of one surface of the sensor panel, and a second housing that covers at least part of another surface of the sensor panel; and
a first detector that detects infiltration of a liquid into the housing, and at least part of the first detector is disposed on both sides that are of the first housing and the second housing between which a contact area intervenes.

2. The radiographic imaging apparatus according to claim 1, wherein at least part of the first detector is disposed in the housing and outside of the scintillator in a direction parallel with a plane of the housing.

3. The radiographic imaging apparatus according to claim 2, wherein at least part of the first detector is disposed in the housing and outside of the sensor panel in the direction parallel with the plane of the housing.

4. The radiographic imaging apparatus according to claim 2, wherein the first detector is entirely disposed in the housing and outside of the sensor panel in the direction parallel with the plane of the housing.

5. A radiographic imaging apparatus, comprising:
a sensor panel that includes a scintillator that emits light by receiving radiation, and a plurality of radiation detection elements that detect the emitted light;
a housing that stores the sensor panel, wherein the housing includes a first housing that covers at least part of one surface of the sensor panel, and a second housing that covers at least part of another surface of the sensor panel; and
a first detector that detects infiltration of a liquid into the housing, and at least part of the first detector is disposed at a position where a contact area between the first housing and the second housing is covered.

6. The radiographic imaging apparatus according to claim 5, wherein a waterproof member resides between the first housing and the second housing.

7. The radiographic imaging apparatus according to claim 1, wherein the first detector is disposed in at least a position corresponding to a corner of the housing.

8. A radiographic imaging apparatus comprising:
a sensor panel that includes a scintillator that emits light by receiving radiation, and a plurality of radiation detection elements that detect the emitted light;
a housing that stores the sensor panel; and
a first detector that detects infiltration of a liquid into the housing, wherein the first detector is disposed in at least positions corresponding to all corners of the housing.

9. The radiographic imaging apparatus according to claim 7, wherein the corner of the housing is provided with a protection member.

10. A radiographic imaging apparatus comprising:
a sensor panel that includes a scintillator that emits light by receiving radiation, and a plurality of radiation detection elements that detect the emitted light;

a housing that stores the sensor panel, and wherein the scintillator is disposed on an incident side of the radiation in the housing; and a first detector that detects infiltration of a liquid into the housing, the first detector is disposed on an opposite side of a side where the scintillator is disposed in the housing.

11. The radiographic imaging apparatus according to claim 1, wherein the scintillator is disposed on an incident side of the radiation in the housing, and the first detector is disposed on a side identical to a side where the scintillator is disposed in the housing.

12. The radiographic imaging apparatus according to claim 1, comprising a notifier that issues a notification about a detection result of the first detector.

13. The radiographic imaging apparatus according to claim 1, comprising an output device that outputs a detection result of the first detector.

14. The radiographic imaging apparatus according to claim 1, wherein the first detector detects the infiltration of the liquid into the housing, by detecting change in electric resistance at an electrode or between electrodes provided in the housing.

15. The radiographic imaging apparatus according to claim 1, further comprising:

a second detector that detects a breakage of the housing.

16. A maintenance management system, comprising:

the radiographic imaging apparatus according to claim 1;

an output device that outputs a detection result of the detector to an external apparatus; and a notifier that is provided in the external apparatus, and issues a notification about the detection result.

\* \* \* \* \*